(12) United States Patent
Hamby et al.

(10) Patent No.: US 10,993,388 B2
(45) Date of Patent: *May 4, 2021

(54) IRRADIANCE-CONTROLLED FIXTURE FOR HORTICULTURAL APPLICATIONS

(71) Applicant: Osram Sylvania Inc., Wilmington, MA (US)

(72) Inventors: David Hamby, Andover, MA (US); Richard Speer, Concord, MA (US); John Selverian, North Reading, MA (US); Alan Sarkisian, Marblehead, MA (US); Rodrigo Pereyra, Salem, MA (US)

(73) Assignee: Osram Sylvania Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/550,490

(22) Filed: Aug. 26, 2019

(65) Prior Publication Data
US 2019/0373824 A1    Dec. 12, 2019

Related U.S. Application Data

(63) Continuation of application No. 15/657,647, filed on Jul. 24, 2017, now Pat. No. 10,455,779.

(51) Int. Cl.
*A01G 22/00*    (2018.01)
*A01G 9/26*    (2006.01)
(Continued)

(52) U.S. Cl.
CPC .............. *A01G 22/00* (2018.02); *A01G 7/045* (2013.01); *A01G 9/26* (2013.01); *G01J 1/08* (2013.01);
(Continued)

(58) Field of Classification Search
CPC .......... A01G 22/00; A01G 7/045; A01G 9/26; H05B 33/0815; H05B 33/0818; H05B 33/0884; H05B 33/0809; H05B 33/0848; H05B 33/0857; H05B 33/0887; H05B 45/10; H05B 45/20; H05B 45/50;
(Continued)

(56) References Cited

U.S. PATENT DOCUMENTS 8,847,514 B1 * 9/2014 Reynoso ................ H05B 47/19
315/307
9,820,447 B2 * 11/2017 Vilgiate ................ H05B 45/00
(Continued)

*Primary Examiner* — Amy Cohen Johnson
*Assistant Examiner* — Syed M Kaiser
(74) *Attorney, Agent, or Firm* — Yutian Ling

(57) ABSTRACT

Various implementations disclosed herein includes a method for operating lighting fixtures in horticultural applications. The method may include receiving a user input of a desired irradiance for a first color channel of one or more lighting fixtures that irradiates a plant bed, in which each of the one or more lighting fixtures comprises at least one light emitting diode (LED) array, determining, for each of the one or more lighting fixtures, a PWM setting of the first color channel such that each of the one or more lighting fixtures irradiate the plant bed at the desired irradiance based on calibration data stored in each of the one or more lighting fixtures, and applying, to each of the one or more lighting fixtures, the determined PWM setting of the first color channel.

20 Claims, 7 Drawing Sheets

(51) Int. Cl.

| | | |
|---|---|---|
| *A01G 7/04* | (2006.01) | |
| *H05B 45/10* | (2020.01) | |
| *H05B 45/20* | (2020.01) | |
| *H05B 47/19* | (2020.01) | |
| *G01J 1/32* | (2006.01) | |
| *G01J 1/08* | (2006.01) | |
| *H05B 45/50* | (2020.01) | |
| *H05B 47/105* | (2020.01) | |
| *H05B 45/325* | (2020.01) | |

(52) U.S. Cl.
CPC .............. *G01J 1/32* (2013.01); *H05B 45/10* (2020.01); *H05B 45/20* (2020.01); *H05B 45/325* (2020.01); *H05B 45/50* (2020.01); *H05B 47/105* (2020.01); *H05B 47/19* (2020.01)

(58) Field of Classification Search
CPC .... H05B 47/19; H05B 47/105; H05B 45/325; G01J 1/08; G01J 1/32
See application file for complete search history.

(56) References Cited

U.S. PATENT DOCUMENTS

| | | | | |
|---|---|---|---|---|
| 9,872,357 B1* | 1/2018 | Aikala | ................. | H05B 47/105 |
| 10,172,296 B2* | 1/2019 | Krijn | ...................... | A01G 7/045 |
| 10,292,340 B2* | 5/2019 | Berinsky | ................ | H05B 45/00 |
| 10,302,493 B2* | 5/2019 | Yao | ........................ | H05B 45/22 |
| 2002/0074559 A1* | 6/2002 | Dowling | ................. | A61N 5/06 |
| | | | | 257/99 |
| 2005/0174473 A1* | 8/2005 | Morgan | ............... | H05B 45/355 |
| | | | | 348/370 |
| 2007/0086912 A1* | 4/2007 | Dowling | ................ | A01M 1/04 |
| | | | | 422/1 |
| 2009/0007295 A1* | 1/2009 | Phillips | ................ | C12N 9/0071 |
| | | | | 800/278 |
| 2011/0179706 A1* | 7/2011 | Hunt | ...................... | A01G 7/045 |
| | | | | 47/58.1 LS |
| 2012/0235600 A1* | 9/2012 | Simonian | ............... | H05B 31/50 |
| | | | | 315/312 |
| 2013/0258684 A1* | 10/2013 | Yang | ........................ | A01G 9/26 |
| | | | | 362/386 |
| 2013/0307419 A1* | 11/2013 | Simonian | ............... | H05B 45/20 |
| | | | | 315/153 |
| 2014/0128941 A1* | 5/2014 | Williams | ................. | A61N 5/06 |
| | | | | 607/88 |
| 2015/0015697 A1* | 1/2015 | Redden | .................. | G01B 11/24 |
| | | | | 348/89 |
| 2015/0163888 A1* | 6/2015 | Fredricks | ........... | H05B 37/0245 |
| | | | | 119/51.04 |
| 2016/0000020 A1* | 1/2016 | Sugimoto | .............. | G06Q 50/02 |
| | | | | 47/66.6 |
| 2016/0007424 A1* | 1/2016 | Maxik | ................ | H05B 33/0854 |
| | | | | 315/153 |
| 2016/0365825 A1* | 12/2016 | Poivet | ...................... | H02S 20/23 |
| 2017/0023193 A1* | 1/2017 | Thosteson | .......... | H05B 37/0272 |
| 2017/0034895 A1* | 2/2017 | Vogel | ...................... | A01G 22/00 |
| 2017/0241632 A1* | 8/2017 | Nguyen | ................. | F21V 29/59 |
| 2017/0295727 A1* | 10/2017 | Ashdown | ............... | A01G 22/00 |
| 2018/0007845 A1* | 1/2018 | Martin | .................. | A01G 31/047 |
| 2018/0228000 A1* | 8/2018 | Aykroyd | ........... | H05B 33/0809 |
| 2018/0313760 A1* | 11/2018 | Kramer | ............. | G01N 21/6456 |
| 2019/0090330 A1* | 3/2019 | Aykroyd | ................. | F21S 4/28 |
| 2019/0259108 A1* | 8/2019 | Bongartz | ............. | A01B 79/005 |

* cited by examiner

IRRADIANCE-CONTROLLED FIXTURE FOR HORTICULTURAL APPLICATIONS

CROSS-REFERENCE TO RELATED APPLICATIONS

This application is a continuation of U.S. patent application Ser. No. 15/657,647, entitled "Irradiance-controlled fixture for horticultural applications," filed Jul. 24, 2017, which is hereby incorporated by reference in its entirety.

FIELD OF THE DISCLOSURE

This disclosure relates to lighting for horticultural applications, and more particularly to systems and methods for controlling the irradiance of light emitting diode (LED) lighting fixtures.

BACKGROUND

Horticultural systems utilize light sources that emit light of various wavelengths to encourage plant growth. Generally, in the context of horticultural applications light is measured in terms of irradiance, which is the flux of radiant energy per unit area. A common unit for measuring irradiance is micromoles per square meter per second ($\mu mol/m^2$-s). Light sources used in horticultural applications are set to emit light with a certain irradiance depending on a number of factors, including the type of plant that is being grown and the distance between the light sources and the plant bed.

SUMMARY

Various implementations disclosed herein may include a method for operating lighting fixtures in horticultural applications. The method may include receiving a user input of a desired irradiance for a first color channel of one or more lighting fixtures that irradiates a plant bed, in which each of the one or more lighting fixtures includes at least one light emitting diode (LED) array, determining, for each of the one or more lighting fixtures, a pulse width modulation (PWM) setting of the first color channel such that each of the one or more lighting fixtures irradiate the plant bed at the desired irradiance based on calibration data stored in each of the one or more lighting fixtures, and applying, to each of the one or more lighting fixtures, the determined PWM setting of the first color channel.

In some embodiments, the one or more lighting fixtures supports a plurality of color channels including the first color channel. In some embodiments, the user input of the desired irradiance is in units of micromoles per square meter per second. In some embodiments, the calibration data includes a total light output of each of the at least one LED array measured in an integrating sphere, and an irradiance map of irradiance values of a plurality of color channels, including the first color channel, driven at a predetermined PWM setting at a predetermined distance from the lighting fixture. In some embodiments, each lighting fixture is driven at a fixed current and the determined PWM setting for each of the one or more lighting fixtures is different. In some embodiments, determining, for each of the one or more lighting fixtures, the PWM setting of the first color channel is further based on at least one of a distance between the one or more lighting fixtures and the plant bed, a layout of the LED array on each of the one or more lighting fixtures, a geometry of the plant bed, a structure of the one or more lighting fixtures, and optical properties of one or more lenses on each of the one or more lighting fixtures. In some embodiments, the determined PWM setting is expressed as a percentage of a maximum current for each of the one or more lighting fixtures. In some embodiments, each lighting fixture stores a plurality of sets of calibration data. In some embodiments, each lighting fixture selects a set of calibration data from the plurality of sets of calibration data based on information received from sensors coupled to each lighting fixture.

Additional implementations disclosed herein include a horticultural lighting system, which includes one or more lighting fixtures that irradiate a plant bed, in which each of the one or more lighting fixtures includes at least one light emitting diode (LED) array and in which each of the one or more lighting fixtures stores calibration data, and a controller coupled to the one or more lighting fixtures and configured to receive a user input of a desired irradiance for a first color channel of the one or more lighting fixtures, determine, for each of the one or more lighting fixtures, a pulse width modulation (PWM) setting of the first color channel such that the one or more lighting fixtures irradiates the plant bed at the desired irradiance based on the calibration data of each of the one or more lighting fixtures, and apply, to each of the one or more lighting fixtures, the determined PWM setting of the first color channel.

In some embodiments, the one or more lighting fixtures supports a plurality of color channels including the first color channel. In some embodiments, the system further includes a computing device communicatively coupled to the controller, in which the user input is transmitted from the computing device. In some embodiments, the user input of the desired irradiance is in units of micromoles per square meter per second. In some embodiments, the calibration data includes a total light output of each of the at least one LED array measured in an integrating sphere, and an irradiance map of irradiance values of a plurality of color channels, including the first color channel, driven at a predetermined PWM setting at a predetermined distance from the lighting fixture. In some embodiments, each lighting fixture is driven at a fixed current and the determined PWM setting for each of the one or more lighting fixtures is different. In some embodiments, each lighting fixture stores a plurality of sets of calibration data, the system further includes one or more sensors coupled to each lighting fixture, and the controller is further configured to select a set of calibration data from the plurality of sets of calibration data for each lighting fixture based on information received from the one or more sensors coupled to each lighting fixture.

Additional implementations disclosed herein include a non-transitory processor-readable storage medium having stored thereon processor executable instructions configured to cause a processor of a controller to perform operations including receiving a user input of a desired irradiance for a first color channel of one or more lighting fixtures that irradiates a plant bed, in which each of the one or more lighting fixtures includes at least one light emitting diode (LED) array, determining, for each of the one or more lighting fixtures, a pulse width modulation (PWM) setting of the first color channel such that each of the one or more lighting fixtures irradiate the plant bed at the desired irradiance based on calibration data stored in each of the one or more lighting fixtures, and applying, to each of the one or more lighting fixtures, the determined PWM setting of the first color channel.

In some embodiments, the calibration data includes a total light output of each of the at least one LED array measured in an integrating sphere, and an irradiance map of irradiance values of a plurality of color channels, including the first color channel, driven at a predetermined PWM setting at a predetermined distance from the lighting fixture. In some embodiments, each lighting fixture is driven at a fixed current and the determined PWM setting for each of the one or more lighting fixtures is different. In some embodiments, the one or more lighting fixtures supports a plurality of color channels including the first color channel.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
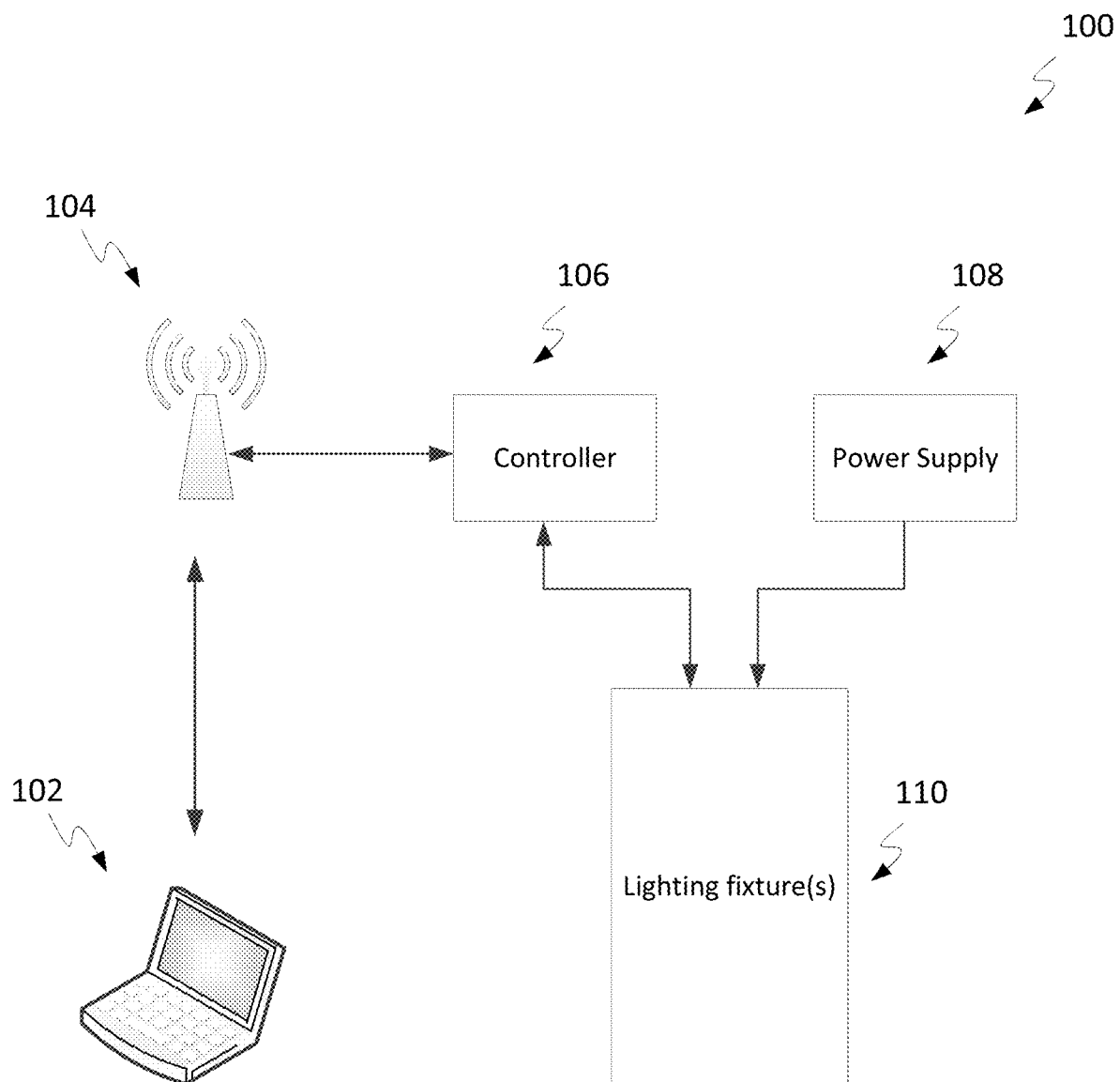
FIG. 1 is a block diagram illustrating a horticultural lighting system in accordance with various embodiments.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

In many applications, the light output of a light source is usually measured in terms of lumens, optical watts, or micromoles per second. However, in the horticultural field the light output of a light source that irradiates a plant bed is usually measured in terms of irradiance, which may be expressed in micromoles per square meter per second ($\mu mol/m^2$-s). Prior to using a light source for plant growth, the light source is usually characterized and documented. The characterization may include creating an irradiance map of the light source as a function of height and lateral position using a calibrated photodiode sensor. In some cases, a goniometer may also be used to determine the relationship between the light source output and the angular distribution from the light source. With this characterization, a user (e.g., a person at the plant growth facility) is able to determine the exact irradiance that a plant bed receives when placed under the light source. The characterization of a light source is usually performed manually and takes a long time. In addition, when one or more elements of the light source are replaced (e.g., a lens) or if a different light source is used, then the characterization is performed again as each light source may have slightly different irradiance characteristics. Thus it is time consuming to characterize each light source before it can be used in a horticultural setting.

Thus, and in accordance with various embodiments of the present disclosure, systems and methods are disclosed for operating lighting fixtures in horticultural applications. The lighting fixture may be a multi-channel light fixture, meaning it may emit light of multiple colors. The lighting fixture may include one or more LED arrays. Calibration data may be collected for each color channel of the lighting fixture before being used in a horticultural setting. The calibration may be conducted by the manufacturer of the lighting fixture before it is installed in a horticultural lighting system. The calibration data may include a total light output of each LED array measured in an integrating sphere, and an irradiance map of irradiance values of each color channel driven at a predetermined PWM setting at a predetermined distance from the lighting fixture. The calibration data may be stored on the lighting fixture and accessible to devices that control the operation of the lighting fixture.

The horticultural lighting system may include one or more lighting fixtures lighting a plant bed, each storing its calibration data, one or more power supplies to power the lighting fixtures, a controller for the lighting fixtures, and a computing device communicatively coupled to the controller and/or the lighting fixtures. The computing device may provide a user interface for controlling the output of the lighting fixtures. The computing device may receive a user input of a desired irradiance for a first color channel of one or more lighting fixtures. The computing device, controller, or a processor on the lighting fixture may determine, for each of the one or more lighting fixtures, a PWM setting of the first color channel such that each of the one or more lighting fixtures irradiate the plant bed at the desired irradiance. In some embodiments, each lighting fixture may be driven at a constant current and the PWM setting controls the amount of current that is applied to the LEDs. In alternative embodiments, the actual current being fed to each lighting fixture may be adjusted to arrive at the desired irradiance. The determination may be based on the input desired irradiance, the calibration data, and other factors such as a distance between the one or more lighting fixtures and the plant bed, a layout of the LED array on each of the one or more lighting fixtures, a geometry of the plant bed, a structure of the one or more lighting fixtures, and optical properties of one or more lenses on each of the one or more lighting fixtures.

The determined PWM setting for the first color channel is then applied to each of the one or more lighting fixtures. The desired irradiance may be expressed as micromoles per square meter per second whereas the determined PWM setting may be expressed as a duty cycle, or percentage of a fixed current that drives each of the one or more lighting fixtures. The value of the fixed current for driving a color channel across all lighting fixtures may depend on the light output characteristics of each lighting fixture. For example, the irradiance of each color channel for each lighting fixture may be measured at maximum drive current. The current associated with the minimum irradiance across all lighting fixtures may be chosen as the fixed drive current for all lighting fixtures. Thus, each lighting fixture may be driven to emit the same irradiance even though their light output characteristics may be slightly different.

By calibrating the lighting fixture before being installed, there is no need for a person to manually characterize the light source at the installation site. Furthermore, a user may input an irradiance value and the horticultural lighting system may automatically convert the input into a PWM setting or current value for each lighting fixture. The user does not have to manually convert the desired irradiance into other unit of light output or operating current for the lighting fixture. Overall, the horticultural lighting system disclosed herein may be easier and quicker for a user to set up and operate than prior approaches.

Horticultural Lighting System Architecture

FIG. 1 is a block diagram illustrating a horticultural lighting system 100 configured in accordance with various embodiments of the present disclosure. The horticultural lighting system 100 may include a computing device 102. The computing device 102 may be in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; (12) a combination of any one or more thereof, or any other electronic device that includes a processor and a memory.

The computing device 102 may be configured to display a user interface for controlling the horticultural lighting system 100, as described in further detail with reference to FIG. 6. For example, a user may input into the user interface a desired irradiance for illuminating one or more plant beds. The computing device 102 may be communicatively coupled to a controller 106 via a wireless access point 104 or another wireless or wired access medium. The computing device 102 may transmit the user input of the desired irradiance to the controller 106.

The controller 106 may be a single board computer or another electronic component that includes at least a processor and a memory. The controller 106 may be configured to convert the desired irradiance to a PWM setting for a fixed current driving one or more lighting fixtures 110 such that the lighting fixtures 110 emits the desired irradiance onto the plant beds, and apply the determined PWM setting to the one or more lighting fixtures 110. In alternative embodiments, the controller 106 may adjust the drive current of the one or more lighting fixtures 110 to achieve the desired irradiance. In an alternative embodiment, the computing device 102 may be configured to convert the desired irradiance to a PWM setting for the one or more lighting fixtures 110 and the controller 106 may be configured to apply the determined PWM setting to the one or more lighting fixtures 110. In another alternative embodiment, the controller 106 may be configured to transmit the desired irradiance to the one or more lighting fixtures 110, and each lighting fixture 110 may be configured to convert the desired irradiance to a PWM setting for that particular lighting fixture. The computing device 102 may communicate with the lighting fixtures 110 through an application programming interfaces (API). The process for converting irradiance to a PWM setting is described in further detail with reference to FIGS. 4-6.

The lighting fixtures 110 may be multi-channel light fixture capable of emitting multiple colors of light. Each lighting fixture 110 may store calibration data which may be used to convert the desired irradiance to a PWM setting for that particular lighting fixture. The configuration and layout of the lighting fixtures 110 is described in further detail with reference to FIG. 2. The lighting fixtures 110 may be connected to one or more power supplies 108, which supply power to the lighting fixtures 110. For example, the power supplies 108 may be 36 Volts direct current (DC) power supplies. The horticultural lighting system 100 may include additional components not illustrated in FIG. 1, and the layout of the horticultural lighting system 100 may be different than as illustrated in FIG. 1. Numerous other such configurations are apparent in light of this disclosure.

Lighting Fixture Layout and Operation

Figure 2:
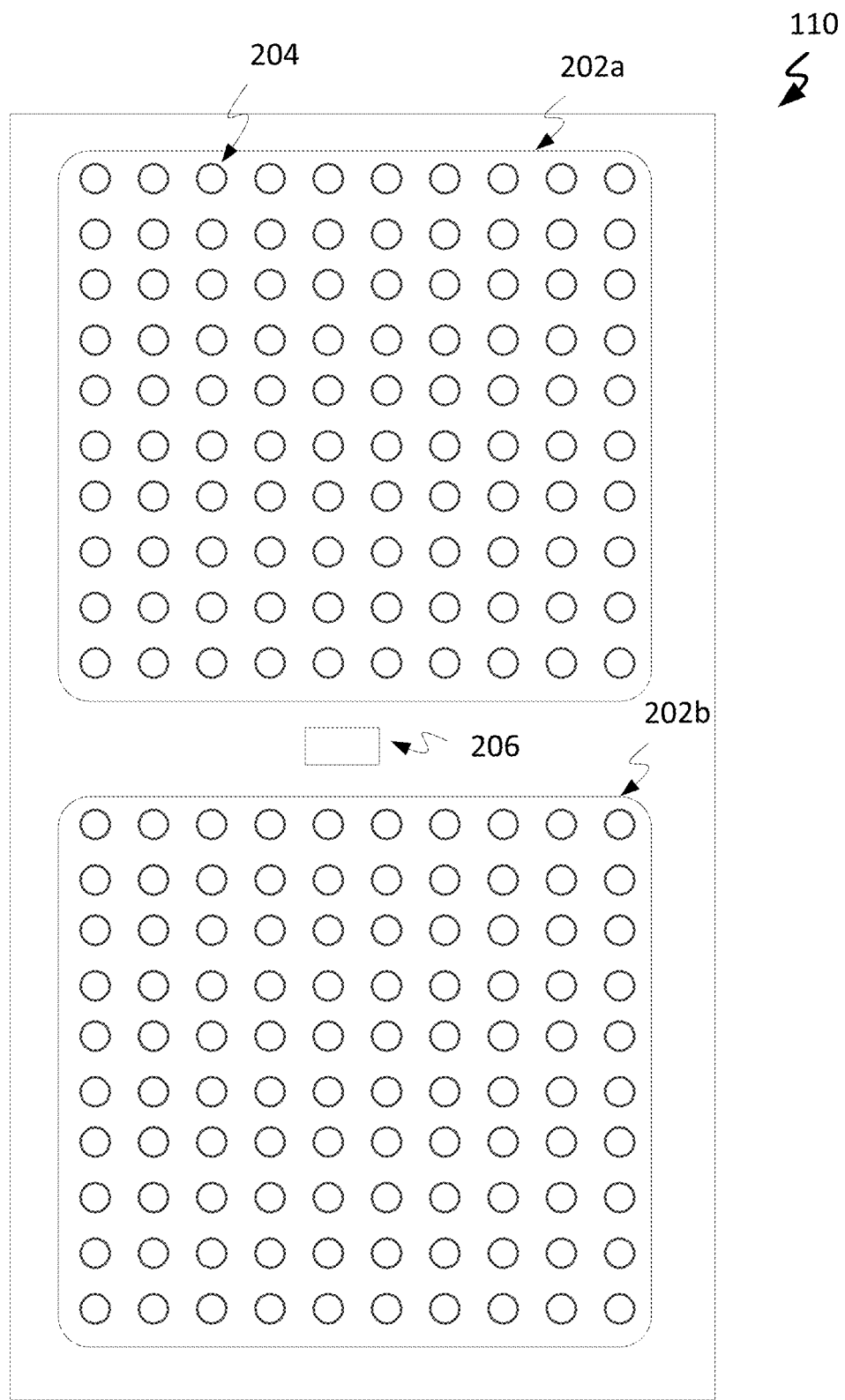
FIG. 2 is a block diagram of a lighting fixture for use in horticultural lighting applications in accordance with various embodiments.

FIG. 2 is a block diagram illustrating the lighting fixture 110 configured in accordance with various embodiments of the present disclosure. The lighting fixture 110 may include one or more LED arrays 202a, 202b. Each LED array 202a, 20b includes a plurality of LEDs 204. Each LED array 202a, 202b may be a multi-channel array, meaning that different LEDs 204 may emit light of different colors. Each LED 204 may be tunable and dimmable. For example, LED array 202a may contain 100 LEDs 104 that support seven color channels: 4 LEDs that emit ultraviolet light at a wavelength of 380 nanometers (nm), 16 LEDs that emit blue light at a wavelength of 450 nm, 16 LEDs that emit green light at a wavelength of 530 nm, 18 LEDs that emit green-shifted white light ("White EQ") at a center wavelength of 565 nm, 20 LEDs that emit 2700 K CCT white light at a center wavelength of 609 nm, 16 LEDs that emit hyper red light at a wavelength of 660 nm, and 10 LEDs that emit far red light at a wavelength of 730 nm. The LED array 202b may contain the same LEDs in the same configuration, or may be configured differently than LED array 202a. The number of LED arrays in a lighting fixture, the number of LEDs for each color channel, the number of color channels, and the wavelength of each color channel are not limited by FIG. 2 and the present disclosure, but may include numerous other configurations.

The lighting fixture 110 may also include circuitry 206. The circuitry 206 may include circuitry for driving and regulating the current driving the LEDs 204. The circuitry 206 may also include memory for storing calibration data particular to the lighting fixture 110. The calibration data may include a total light output of each LED array 202a, 202b measured in an integrating sphere, and an irradiance map of irradiance values for each color channel driven at a predetermined PWM setting at a predetermined distance from the lighting fixture 110. The calibration data may be generated at the manufacturing facility, before being installed in the horticultural lighting system. In some embodiments, the circuitry 206 may also include a processor configured to convert a received desired irradiance (e.g., from a user input on the computing device 102) to a PWM setting for the lighting fixture 110. Devices external to the lighting fixture 110 may communicate with the lighting fixture via an API. The lighting fixture 110 may contain additional components not illustrated in FIG. 2.

Figure 3:
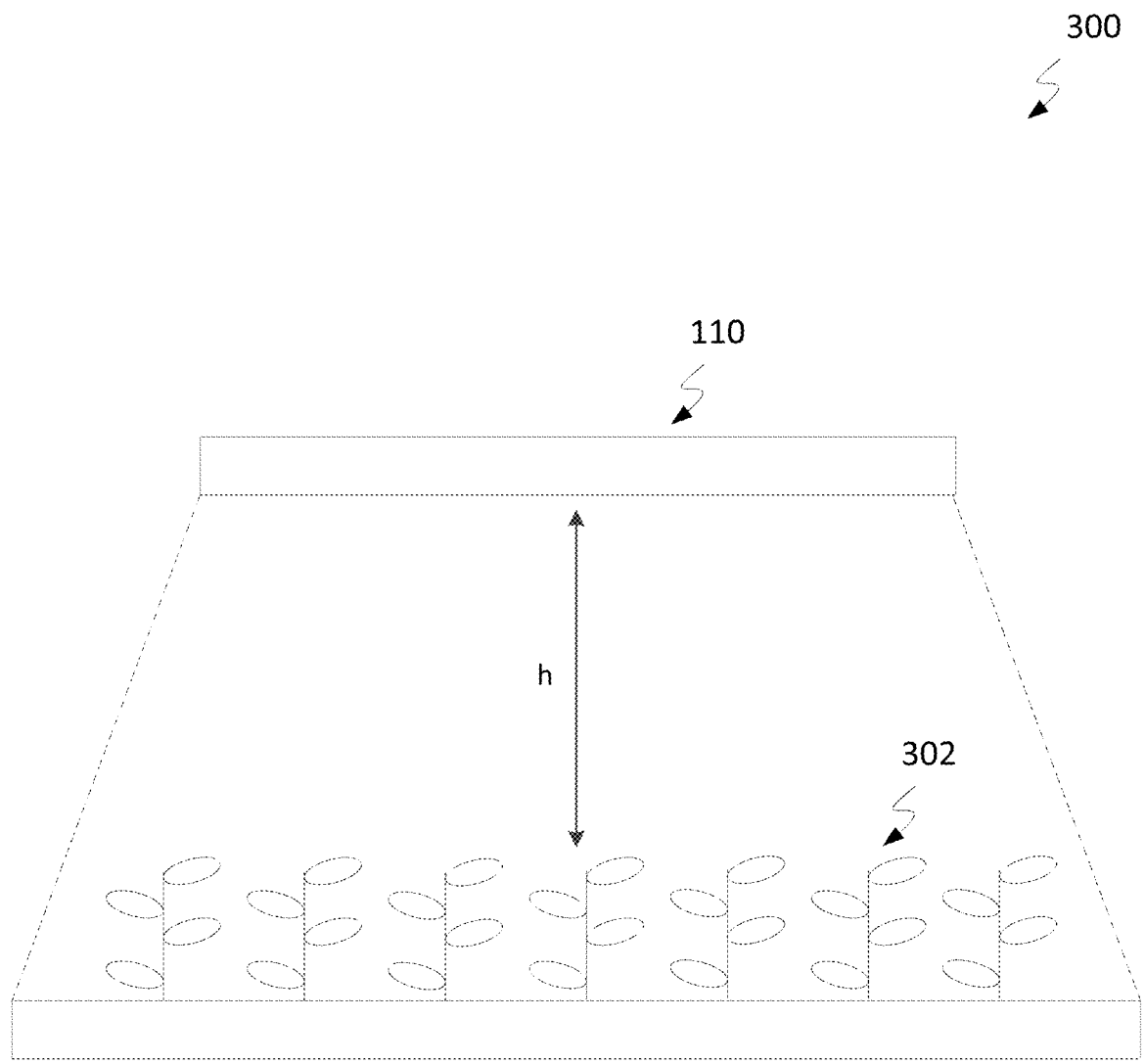
FIG. 3 is a block diagram of a lighting fixture irradiating a plant bed in accordance with various embodiments.

The lighting fixture 110 may be installed in a horticultural lighting system 300 as illustrated in FIG. 3. One or more lighting fixtures 110 may illuminate a plant bed 302. A horticultural lighting system may include a number of plant beds 302, each illuminated by one or more lighting fixtures 110. The irradiance of the lighting fixtures 110 as experienced by the plant bed 302 is dependent on the height h of the lighting fixtures 110 above plant bed. Generally, the height h is measured from the lighting fixtures 110 to the top of the plant canopy of the plant bed 302. The lighting fixtures 110 may be tunable to emit any one or combination of colors onto the plant bed 302, each color at a specified irradiance value as measured at the plant canopy.

Calibration of Lighting Fixtures and Conversion of Irradiance to PWM/Current

Once each lighting fixture 110 is manufactured but before it is shipped and installed in a horticultural lighting system, the lighting fixture 110 may be calibrated and the calibration data may be stored in the lighting fixture 110. The calibration data may be used to determine the PWM setting for the lighting fixture 110 in order to achieve a specified irradiance value for a plant bed.

The calibration data may include the total light output (in lumens) of each color channel for each board of LED arrays 202*a*, 202*b*, measured in an integrating sphere. The integrating sphere measurements may be made at several different PWM values for the LED array boards, for example at 20%, 40%, 60%, 80%, and 100% duty cycle for each color channel of each LED array board. In some embodiments, each color channel of each LED array board being measured may be driven at the same drive current. The integrating sphere measurements may be used to generate polynomials for each color channel of each LED array board that relate normalized radiated power to PWM values. For example, the maximum light output (i.e., at 100% duty cycle) and the coefficients of a curve fitted to the output versus duty cycle for each color channel of a LED array board may be stored in memory on the lighting fixture that contains the LED array board.

The calibration data may also include an irradiance measurement for each color channel of each LED array board, driven at a predetermined PWM setting and measured at a predetermined distance from the lighting fixture. The predetermined distance may be a planned or a typical height from the lighting fixture to the plant canopy of a plant bed. The irradiance at a given height depends on the maximum light output of the LED array board and the distribution of the light output. The light output distribution depends on a number of factors, including the predetermined height, arrangement of LEDs on the LED array board, the arrangement of the boards on the lighting fixtures, and the lenses or other optics on each LED array board. If each LED array board is designed the same, the distribution would be the same. The irradiance measurement may take the form of an irradiance map or table of irradiance values in a plane parallel to the lighting fixture at a distance equal to the predetermined distance from the lighting fixture. For example, if the predetermined distance is 16 inches, then an irradiance area of one square meter, at 25 millimeter (mm) LED spacing, may be sufficient to map the performance of an LED array board. The predetermined PWM setting may be, for example, 100% duty cycle for each LED array board. The irradiance measurements may be made using a XY table, a calibrated irradiance meter, and automated software.

Figure 4:
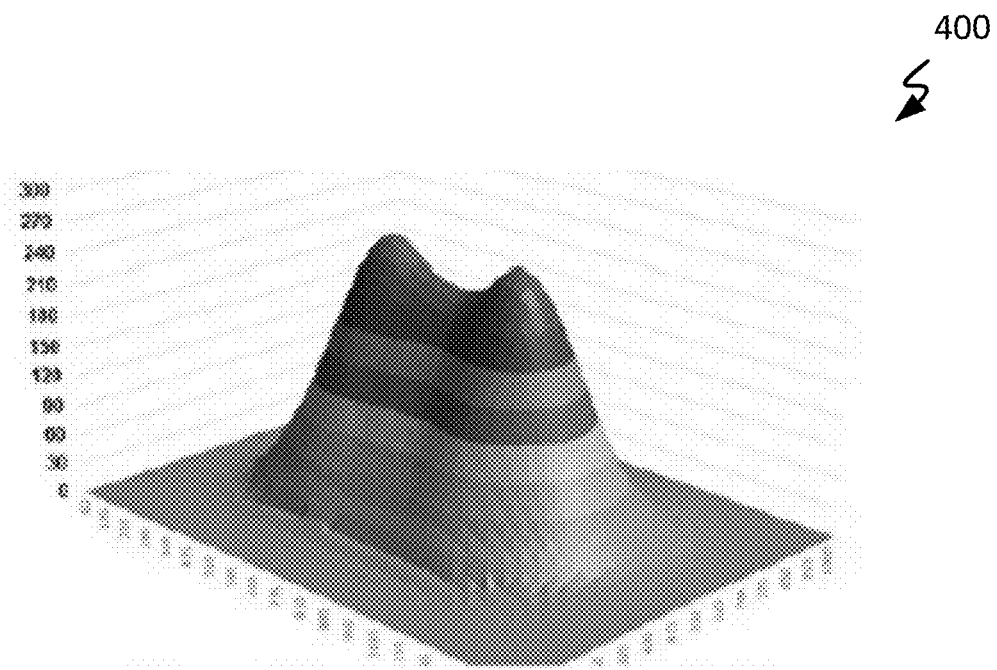
FIG. 4 is an irradiance plot for a lighting fixture including two LED arrays in accordance with various embodiments.

If each LED array board on each lighting fixture are the same (e.g., same number of LEDs of each color, same wavelength, same layout), then the irradiance map for one LED array board may be measured and the results may be duplicated for the other LED array boards and superimposed to produce an irradiance map for multiple LED arrays and lighting fixtures. For example, FIG. 4 shows an irradiance plot 400 for a lighting fixture including two LED array boards in accordance with various embodiments, such as the lighting fixture 110 as illustrated in FIG. 2. If both LED array boards in the lighting fixture are the same, then the irradiance may be measured for one LED array board and then duplicated for the second LED array board. The irradiance plot 400 may be a superposition of the irradiance measurements for each LED array board, assuming that the LED array boards are driven to emit the same irradiance at the predetermined distance. For example, the two peaks in the irradiance plot 400 correspond to the centers of each LED array board, and the irradiance value at a particular point of the irradiance plot 400 is the sum of the irradiance measurements of each LED array board at that point. As can be seen, the irradiant light forms a circular pattern with the highest intensity at the center of the LED array board.

The irradiance distribution as seen in the irradiance plot 400 remains the same given the same predetermined distance and fixed optics on the LED array board, but the absolute value of the irradiance within the distribution changes with different drive currents. However, because the distribution is constant the irradiance measurement can be performed at a single current and scaled with the value of the driving current.

Figure 5:
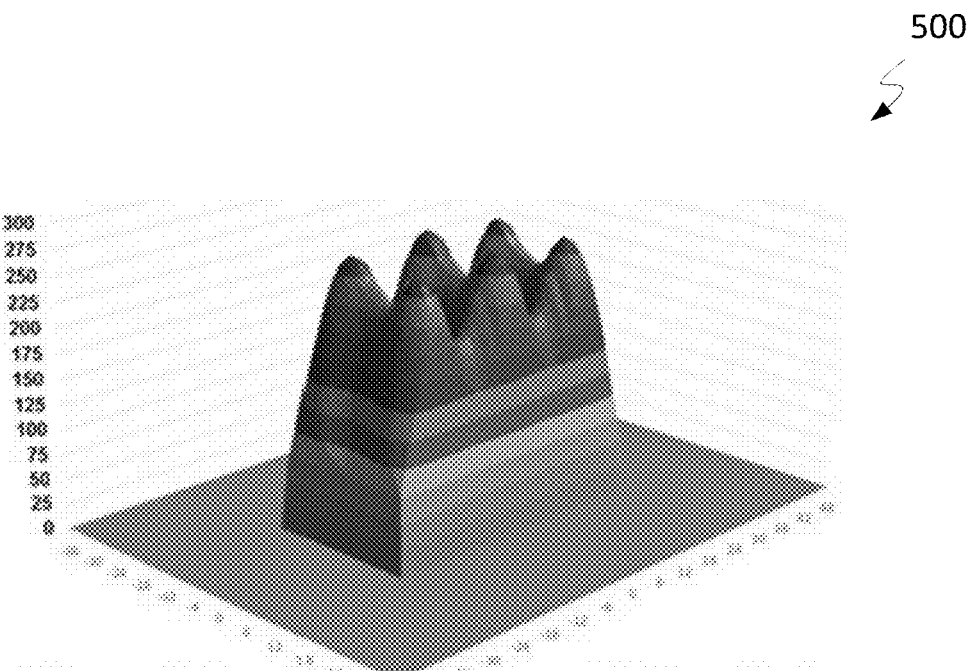
FIG. 5 is an irradiance plot for three lighting fixtures, each including two LED arrays, in accordance with various embodiments.

FIG. 5 shows an irradiance plot 500 for three lighting fixtures illuminating a plant bed, each including two LED array boards, in accordance with various embodiments. Assuming each LED array board in each lighting fixture is the same, then the irradiance plot 400 may be duplicated for each lighting fixture and the irradiance plot 500 may be a superposition of the irradiance map for each individual lighting fixture. In other words, the irradiance value at a particular point of the irradiance plot 500 is the sum of the irradiance measurements of each LED array board of each lighting fixture at that point. The irradiance plot 500 may be truncated to fit the dimensions of a plant bed, as shown in FIG. 5. The average irradiance of the irradiance plot 500 may be calculated, and an irradiance map may be generated that is normalized to the average irradiance.

Figure 6:
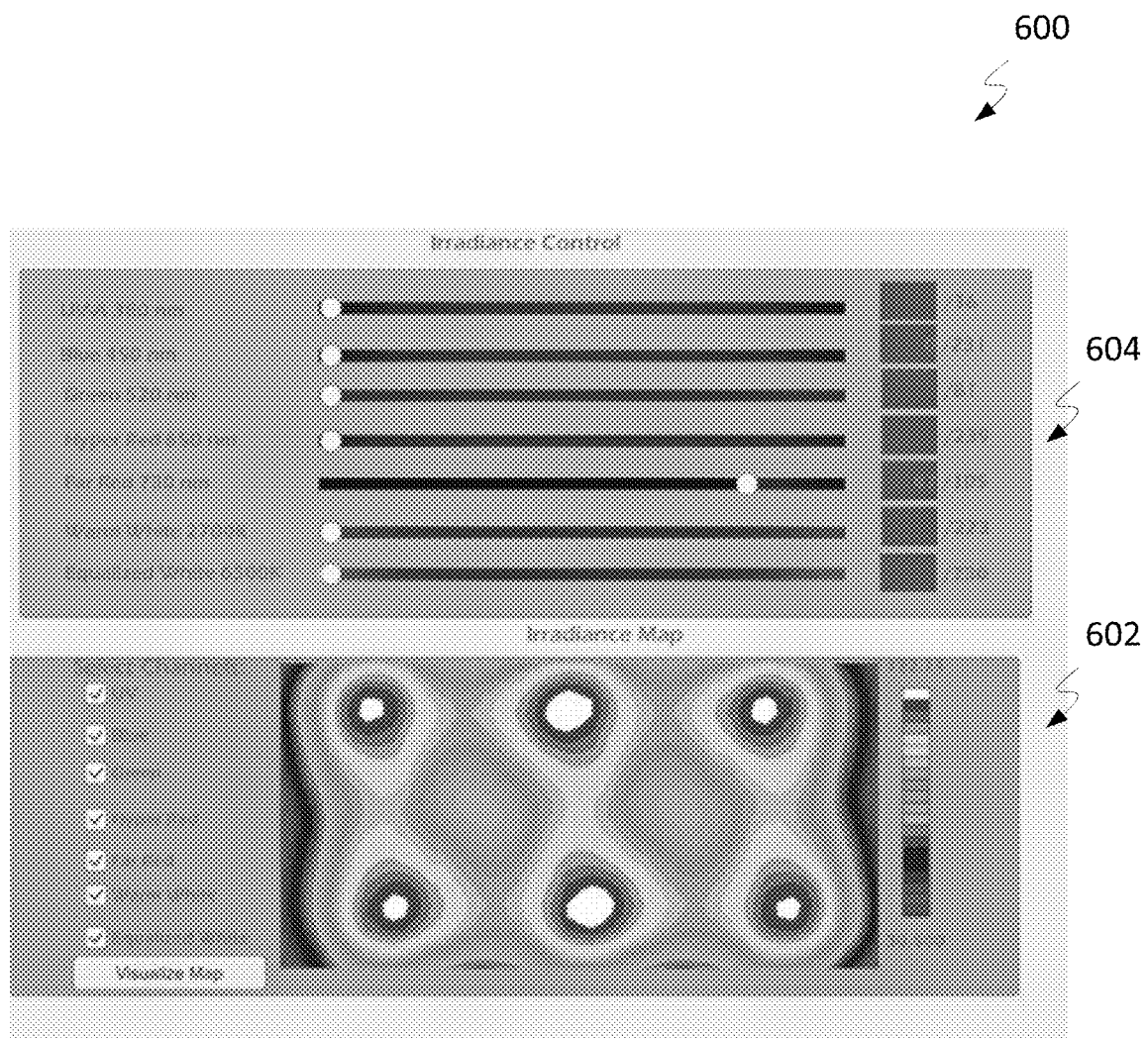
FIG. 6 is a user interface for inputting irradiance values to control a horticultural lighting system in accordance with various embodiments.

FIG. 6 shows a user interface 600 for inputting irradiance values to a horticultural lighting system in accordance with various embodiments. The user interface 600 may be presented at a computing device communicatively connected to the lighting fixtures, such as computing device 102 in FIG. 1. The user interface 600 may include an irradiance map 602. The irradiance map 602 may show an overhead distribution of the irradiance plot 500 normalized to the average irradiance. An absolute irradiance map may be generated by multiplying the values in the irradiance map 602 by the average irradiance value. In the context of controlling the irradiance of the lighting fixtures, the absolute irradiance map may be generated by multiplying the values in the irradiance map 602 by the desired irradiance value.

The calibration data may also include information relating the integrating sphere light output measurements with the irradiance measurements. This information may take the form of a "sphere factor." When the irradiance measurements for a single LED array is integrated, the result equals the amount of total energy per time striking the measurement area (e.g., one square meter). Dividing the result by the integrating sphere total light output value equals the sphere factor. Thus the calibration may include calculating the sphere factor for each color channel. The integrating sphere total light output value includes all light emitted from the LED array, but not all of the light emitted by an LED array strikes the plant bed. This light loss is embodied in the sphere factor, as it is always less than one. For example, if the sphere factor for a color channel is 0.86, then a 1 Watt (W) total light output value in the integrating square would equal 0.86 W of radiated light that strikes the area centered below the LED array at a distance equal to the predetermined distance.

The calibration data is dependent upon a number of factors. These factors may include the height of the lighting fixture above the plant bed, the size of the plant bed, the lenses affixed on the LEDs, the lighting fixture structure and geometry (e.g., shape, dimensions, presence of diffuser cover), and the layout of the LEDs. If any of these factors are changed, the lighting fixture should be recalibrated and the new calibration data is stored in the memory of the lighting fixture. The calibration data may include different sets of data corresponding to changes in one or more of the factors so that certain changes may be made without having to recalibrate the lighting fixture. For example, the lighting fixture may store calibration data for different distances between the plant bed and the lighting fixture to account for the vertical growth of plants over time. In some embodiments, the lighting fixture may receive information from sensors coupled to the lighting fixture. The sensors may detect the height of the lighting fixture from the plant bed and the spacing between the lighting fixtures. With this information, the lighting fixture may select the appropriate calibration data stored in memory.

The user interface 600 illustrated in FIG. 6 also includes an irradiance input 604, which allows a user to input a desired irradiance for each color channel of one or more lighting fixtures irradiating one or more plant beds. The input irradiance may be in units of micromoles per square meter per second ($\mu mol/m^2$-s). The irradiance input 604 may also include a slider for each color channel that may be used to change the desired irradiance between a minimum value and a maximum value. The irradiance input 604 is not limited to the interface as shown in FIG. 6, but may be presented in numerous configurations known in the art. When the user inputs a desired irradiance for a selected color channel, the computing device may communicate the desired irradiance to a controller, which converts the desired irradiance into a PWM setting for the selected color channel of the one or more lighting fixtures and then applies the determined PWM setting. The irradiance map 602 may be updated in real time based on the user input.

There are a number of ways to determine a PWM setting for a color channel of one or more lighting fixtures from a desired irradiance. One method is described below, but the present disclosure is not limited to the described method but may encompass numerous methods known in the art. First, the desired irradiance may be multiplied by the area of the plant bed irradiated by the lighting fixtures, and the result is divided by a plant bed canopy factor. The plant bed canopy factor represents the fraction of light generated by the lighting fixture that actually strikes the plant bed, and is a function of the height of the lighting fixture above the plant bed, the spacing of the LED arrays on each lighting fixture, the spacing between lighting fixtures, the optical elements on each lighting fixture, and the color of the selected color channel. The result is then divided by the number of LED arrays in the lighting fixtures to yield a value representing the number of micromoles per second emitted by a single LED array.

This value is divided by a color factor, which is specific to the wavelength of the color of the color channel (e.g., 3.76 $\mu$Mol/W-sec for blue light at 450 nm), to yield the watts irradiated per LED array. This value is divided by the sphere factor (stored in the calibration data) to obtain the desired spherical watts equivalent to the desired irradiance. This value is divided by the integrating sphere total light output at maximum current (stored in the calibration data) to obtain a normalized watt output (i.e., between zero and one). Polynomials that relate normalized radiated power to percentage of full DC current (stored in the calibration data) are applied to the normalized watt output to obtain the percentage of maximum current for the color channel that is equivalent to the desired irradiance. The color channel of the lighting fixtures may then be driven with a fixed current with a specific pulse width modulated (PWM) value or duty cycle so that the actual current matches the calculated percentage of the maximum current. In some embodiments, the process for converting desired irradiance to a PWM setting may also include correcting for temperature and run time of the lighting fixture.

Each lighting fixture has different lighting characteristics and thus different calibration data due to small differences that occur during manufacturing of the LEDs, even if all lighting fixtures are designed to be the same. The horticultural lighting system described herein compensates for these differences through the calibration data. For example, the light output (in lumens) of each color channel for each lighting fixture may be measured when each lighting fixture is driven at its maximum duty cycle and the value is stored in memory on each lighting fixture. The controller may query each lighting fixture for the maximum light output for each color channel and store the maximum values in memory. The controller may reuse these values as long as none of the lighting fixtures are changed or replaced. The controller takes the smallest of the maximum light output for each color channel and sets that value as the maximum allowable light output for each lighting fixture. Although each lighting fixture is driven by the same current, different PWM settings may be applied to each lighting fixture. A user may input a single desired irradiance for a color channel across several lighting fixtures, and the system determines the PWM setting for each lighting fixture (which may be different) such that all the lighting fixtures emit equal irradiances for that color channel. This avoids the need for a user to manually tune each lighting fixture to achieve equal irradiances. For example, a user may input a desired irradiance for a color channel equal to the maximum allowable light output across all lighting fixtures. The controller would drive the color channel of the lighting fixture with the smallest maximum light output at 100% duty cycle, but would scale the duty cycles of the other lighting fixtures (e.g., 75%, 50%) to match the irradiance of the lighting fixture with the smallest maximum light output. This method ensures uniform irradiance across all lighting fixtures even though each individual lighting fixture has different light output characteristics.

Example Methods for Operating a Horticultural Lighting System

Figure 7:
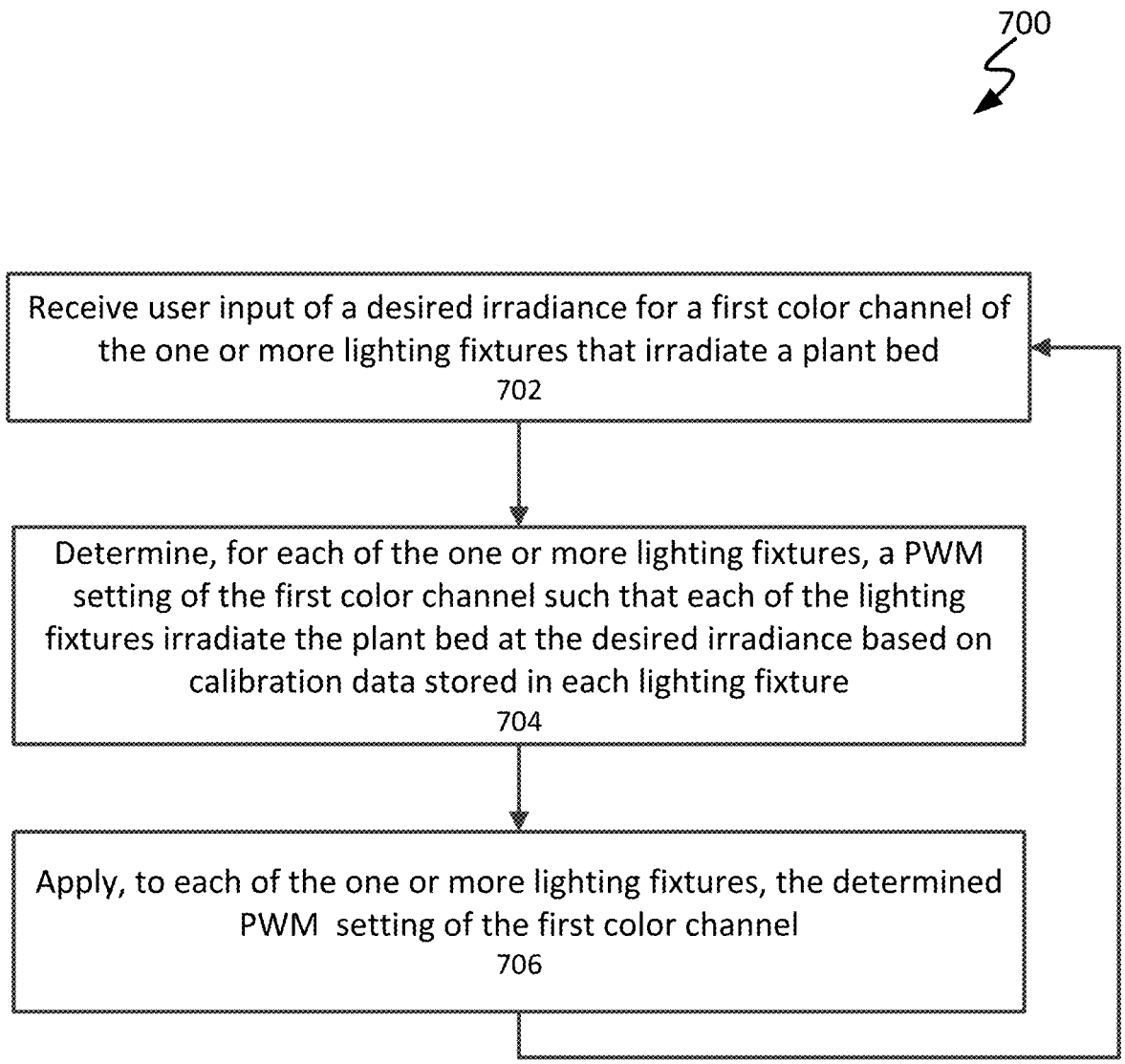
FIG. 7 is a flow chart of an example method for operating lighting fixtures in horticultural applications in accordance with various embodiments.

FIG. 7 is a flow chart of an example method 700 for operating a horticultural lighting system in accordance with various embodiments of the present disclosure. The method 700 may be performed by one or a combination of a computing device (e.g., computing device 102), a controller (e.g., controller 106), and one or more lighting fixtures (e.g., lighting fixture 110) in a horticultural lighting system such as illustrated in FIG. 1. The computing device may be communicatively coupled to the controller via a wired or wireless connection (e.g., a WiFi router). The controller may control the PWM settings of the one or more lighting fixtures. Each lighting fixture may support a plurality of color channels, and may each include one or more LED arrays such as LED arrays 202a, 202b illustrated in FIG. 2.

In block 702, the computing device may receive a user input of a desired irradiance for a first color channel of one or more lighting fixtures that irradiate a plant bed. The computing device may display a user interface (e.g., user interface 600 shown in FIG. 6) that allows a user to input a desired irradiance. In some embodiments, the units of the input irradiance may be micromoles per square meter per second (μmol/m²-s). The controller may receive the user input from the computing device.

In block 704, the controller may determine, for each of the one or more lighting fixtures, a PWM setting of the first color channel such that each of the lighting fixtures irradiate the plant bed at the desired irradiance based on calibration data stored in each lighting fixture. An example method for converting a desired irradiance to a PWM setting for color channel of a lighting fixture is described in further detail with reference to FIG. 6. In summary, the desired irradiance may be multiplied by the area of the plant bed, divided by a plant bed canopy factor, then divided by the number of LED arrays in the lighting fixtures, then divided by a color factor, then divided by the sphere factor, then divided by the integrating sphere total light output at maximum current. Polynomials that relate normalized radiated power to percentage of full DC current are applied to the result to obtain the percentage of maximum current for the color channel that is equivalent to the desired irradiance. In some embodiments, the method for converting desired irradiance to a PWM setting may also include correcting for temperature and run time of the lighting fixture.

In alternative embodiments, the computing device may determine the PWM setting and transmit the PWM setting to the controller. In other alternative embodiments, each lighting fixture may receive the desired irradiance from the controller and determine its own PWM setting. The computing device may communicate with the controller and the lighting fixtures through an API.

The calibration data may be stored in memory on each lighting fixture and are specific to each lighting fixture. The calibration data may include a total light output of each of the LED arrays in the lighting fixture measured in an integrating sphere, and an irradiance map/table of irradiance values of each color channel driven at a predetermined PWM setting at a predetermined distance from the lighting fixture. In some embodiments, the calibration data may also include information relating the integrating sphere light output measurements with the irradiance measurements, such as a sphere factor that is equal to the integral of the irradiance measurement for a single LED array divided by the integrating sphere total light output. In some embodiments, the calibration data may also include polynomials that relate normalized radiated power to percentage of full DC current. Methods for generating the calibration data are described in further detail with reference to FIGS. 4-5. The calibration data may be generated after manufacturing and before it is installed in the horticultural lighting system.

The calibration data may depend on a number of factors, including the height of the lighting fixture above the plant bed, the size of the plant bed, the lenses affixed on the LEDs, the lighting fixture structure and geometry (e.g., shape, dimensions, presence of diffuser cover), and the layout of the LEDs. In some embodiments, if one or more of the factors change the lighting fixture is recalibrated in order to generate updated calibration data. In some embodiments, the calibration data may include different sets of data corresponding to changes in one or more of the factors. For example, the lighting fixture may store calibration data for different distances between the plant bed and the lighting fixture to account for the vertical growth of plants over time. In some embodiments, the lighting fixture may receive information from sensors coupled to the lighting fixture. The sensors may detect the height of the lighting fixture from the plant bed and the spacing between the lighting fixtures. With this information, the lighting fixture may select the appropriate calibration data stored in memory.

In block 706, the controller may apply, to each of the one or more lighting fixtures, the determined PWM setting of the first color channel. For example, the controller may change the pulse width modulation (PWM) value applied to a fixed current driving the color channel on each lighting fixture. Each lighting fixture may be driven by the same fixed current but may have a different PWM setting to achieve the same desired irradiance because of material or manufacturing differences in each lighting fixture. The controller may apply different PWM settings to each lighting fixture so that all of the lighting fixtures emit the same irradiance. In alternative embodiments, the controller may adjust the actual current driving each of the one or more lighting fixtures to achieve the desired radiance. The user interface on the computing device may include an irradiance map that changes in real time based on the user input. The method may then return to block 702 when the user inputs another desired irradiance for the same or a different color channel. In this manner, the method 700 allows a user to input a desired irradiance for a color channel in order to change the PWM setting of one or more lighting fixtures to achieve uniform irradiance across all the lighting fixtures.

Further Considerations

Figure 8:
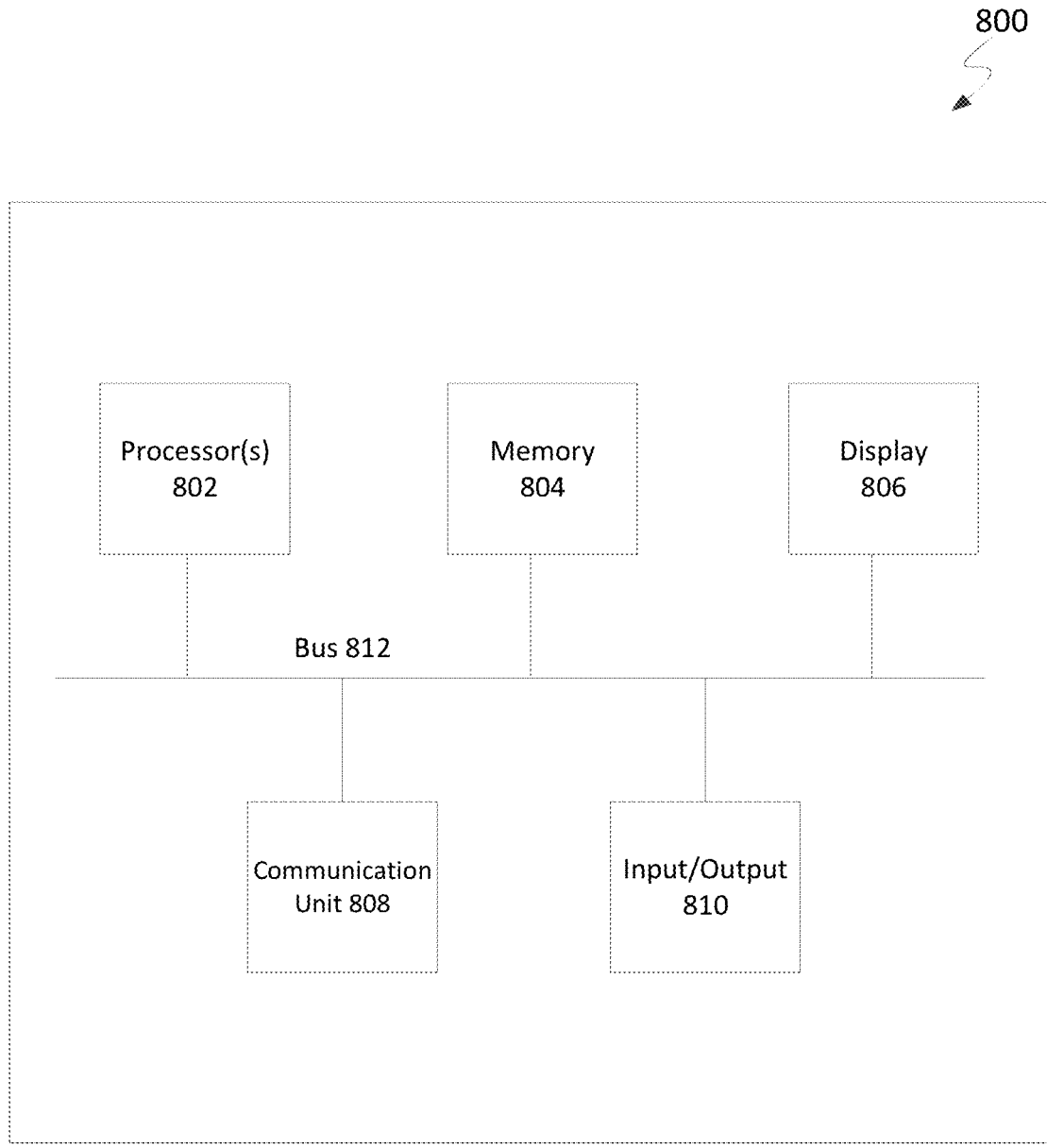
FIG. 8 is a block diagram illustrating a computing device configured in accordance with various embodiments.

FIG. 8 illustrates an example computing device 800 configured in accordance with various embodiments of the present disclosure. The computing device 800 may be similar to the computing device 102 and the controller 106 in FIG. 1, and the circuitry 206 in FIG. 2. The computing device 800 can be any of a wide range of computing platforms, mobile or otherwise. For example, in accordance with some embodiments, computing device 800 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; (12) a single board computer or microprocessor circuit; and/or (13) a combination of any one or more thereof. Other suitable configurations for computing device 800 will depend on a given application and will be apparent in light of this disclosure.

As can be further seen from FIG. 8, computing device 800 may include memory 804 and one or more processors 802. Memory 804 can be of any suitable type (e.g., RAM and/or ROM, or other suitable memory) and size, and in some cases may be implemented with volatile memory, non-volatile memory, or a combination thereof. A given processor 802 of the computing device 800 may be configured as typically done, and in some embodiments may be configured, for example, to perform operations associated with computing device 800 and one or more of the components thereof (e.g., within memory 804 or elsewhere). In some cases, memory 804 may be configured to be utilized, for example, for processor workspace (e.g., for one or more processors 802) and/or to store media, programs, applications, and/or content on computing device 800 on a temporary or permanent basis. The one or more components may be stored in memory 804 (e.g., such as an operating system (OS), user interface, and/or one or more applications) and can be accessed and executed, for example, by the one or more processors 802 of computing device 800. In some embodiments, the memory 802 of the computing device 800 may calibration data for a lighting fixture.

The OS can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. Suitable configurations and capabilities for the OS will depend on a given application and will be apparent in light of this disclosure. A user interface (UI) is provided as commonly done, and generally allows for user interaction with the device 800 (e.g., such as a graphical touched-based UI on various smartphones and tablets). Any number of user interface schemes can be used.

In accordance with some embodiments, memory 804 may have stored therein (or otherwise have access to) one or more applications. In some instances, computing device 800 may be configured to receive input, for example, via one or more applications stored in memory 804 (e.g., such as an application for controlling a horticultural lighting system). In accordance with some embodiments, a given application can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications can be instructions encoded on any suitable non-transitory machine-readable medium that, when executed by one or more processors 802, carries out functionality of a given computing device 800, in part or in whole. In one example embodiment, one of the applications may be an application for controlling a horticultural lighting system in which a user may input a desired irradiance of a color channel for one or more lighting fixtures in the horticultural lighting system.

As can be seen further from FIG. 8, computing device 800 may include a display 806, in accordance with some embodiments. Display 806 can be any electronic visual display or other device configured to display or otherwise generate an image (e.g., image, video, text, and/or other displayable content) there at. In some instances, display 806 may be integrated, in part or in whole, with computing device 800, whereas in some other instances, display 806 may be a stand-alone component configured to communicate with computing device 800 using any suitable wired and/or wireless communications means. In some cases, display 806 optionally may be a touchscreen display or other touch-sensitive display. To that end, display 806 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In a more general sense, and in accordance with some embodiments, an optionally touch-sensitive display 806 generally may be configured to detect or otherwise sense direct and/or proximate contact from a user's finger, stylus, or other suitable implement at a given location of that display 806. In some cases, an optionally touch-sensitive display 806 may be configured to translate such contact into an electronic signal that can be processed by computing device 800 (e.g., by the one or more processors 802 thereof) and manipulated or otherwise used to trigger a given UI action. In some cases, a touch-sensitive display 806 may facilitate user interaction with computing device 800 via the UI presented by such display 806. Numerous suitable configurations for display 806 will apparent in light of this disclosure.

In accordance with some embodiments, computing device 800 may include a communication unit 808, which may be configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some embodiments, communication unit 808 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication unit 808, as desired for a given target application or end-use. Numerous suitable configurations for communication unit 808 will depend on a given application and will be apparent in light of this disclosure.

As can be seen further from FIG. 8, computing device 800 may include one or more input/output devices 810. Examples of input/output devices 810 may include a keyboard, mouse, speakers, microphone, touchscreen (integrated with the display 806), USB and other ports, and/or other forms of input and output known in the art. A user may utilize one or more input devices to input information to the computing device 800, and the computing device may utilize one or more output devices to communication information to the user. The processor(s) 802, memory 804, display 806, communication unit 808, and input/output devices 810 may be connected together through bus 812. The computing device 800 may include additional components not shown in FIG. 8, such as but not limited to additional processors (e.g., graphic processors), sensors, microcontrollers, and image capture devices (e.g., cameras).

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. A horticultural lighting system, comprising:
   a plurality of lighting fixtures that irradiate a plant bed, wherein the plurality of lighting fixtures supports a plurality of color channels and each of the plurality of lighting fixtures:
   comprises a plurality of light emitting diodes (LEDs); and
   stores calibration data that converts a user input to a pulse width modulation (PWM) setting; and
   a controller coupled to the plurality of lighting fixtures and configured to:
   receive, from each lighting fixture, a maximum light output for each color channel;

setting, for each color channel, a maximum allowable light output equal to a smallest maximum light output received from each of the plurality of lighting fixtures for that color channel;

receive a user input for a first color channel in the plurality of color channels, wherein the user input comprises a light parameter measured at a plant canopy of one or more plants grown in the plant bed;

determine, for each of the plurality of lighting fixtures, a pulse width modulation (PWM) setting of the first color channel such that the plurality of lighting fixtures irradiates the plant bed according to the user input based on the calibration data of each of the plurality of lighting fixtures; and apply, to each of the plurality of lighting fixtures, the maximum allowable light output of the first color channel modulated by the determined PWM setting of the first color channel for that lighting fixture.

2. The system of claim 1, further comprising a computing device communicatively coupled to the controller, wherein the user input is transmitted from the computing device.

3. The system of claim 1, wherein the light parameter comprises a desired irradiance at the plant canopy.

4. The system of claim 1, wherein the calibration data depends on one or more factors, including least one of a distance between the each of the plurality of lighting fixtures and the plant canopy, a layout of the plurality of LEDs on each of the plurality of lighting fixtures, a geometry of the plant bed, a structure of each of the plurality of lighting fixtures, and optical properties of one or more lenses on each of the plurality of lighting fixtures.

5. The system of claim 4, wherein each of the plurality of lighting fixtures stores a plurality of sets of calibration data, each set of calibration data associated with a different set of the one or more factors.

6. The system of claim 5, wherein when at least one of the one or more factors is changed for a first lighting fixture in the plurality of lighting fixtures, the controller is configured to:

select, for the first lighting fixture, another set of calibration data from the plurality of sets of calibration data that corresponds to the changed one or more factors; or generate, for the first lighting fixture, a new set of calibration data corresponding to the changed one or more factors.

7. The system of claim 1, wherein the calibration data comprises:

a total light output of the plurality of LEDs measured in an integrating sphere; and an irradiance map of irradiance values of the plurality of color channels, including the first color channel, driven at a predetermined PWM setting at a predetermined distance from the plurality of lighting fixtures.

8. The system of claim 1, wherein the determined PWM setting is expressed as a percentage of a maximum current for each of the plurality of lighting fixtures.

9. The system of claim 1, wherein the determined PWM setting for each of the plurality of lighting fixtures is different.

10. The system of claim 1, wherein each lighting fixture stores different calibration data, the differences caused by manufacturing differences between each lighting fixture.

11. A method for operating a plurality of lighting fixtures supporting a plurality of color channels, the method comprising:

receiving, from each lighting fixture, a maximum light output for each color channel;

setting, for each color channel, a maximum allowable light output equal to the smallest maximum light output received from each of the plurality of lighting fixtures for that color channel;

receiving a user input for a first color channel in the plurality of color channels, wherein the user input comprises a light parameter measured at a plant canopy of one or more plants grown in a plant bed irradiated by the plurality of lighting fixtures;

determining a pulse width modulation (PWM) setting of the first color channel such that the plurality of lighting fixtures irradiates the plant bed according to the user input based on calibration data stored in each of the plurality of lighting fixtures, wherein the calibration data converts the user input into PWM settings; and apply, to each of the plurality of lighting fixtures, the maximum allowable light output of the first color channel modulated by the determined PWM setting of the first color channel for that lighting fixture.

12. The method of claim 11, wherein the light parameter comprises a desired irradiance at the plant canopy.

13. The method of claim 11, wherein the calibration data depends on one or more factors, including least one of a distance between the lighting fixture and the plant canopy, a layout of the plurality of LEDs on the lighting fixture, a geometry of the plant bed, a structure of the lighting fixture, and optical properties of one or more lenses on the lighting fixture.

14. The method of claim 13, wherein each lighting fixture stores a plurality of sets of calibration data, each set of calibration data associated with a different set of the one or more factors.

15. The method of claim 14, wherein when at least one of the one or more factors is changed, the method further comprises one of:

selecting another set of calibration data from the plurality of sets of calibration data that corresponds to the changed one or more factors; and generating a new set of calibration data corresponding to the changed one or more factors.

16. The method of claim 11, wherein the calibration data comprises:

a total light output of the plurality of LEDs measured in an integrating sphere; and an irradiance map of irradiance values of the plurality of color channels, including the first color channel, driven at a predetermined PWM setting at a predetermined distance from the lighting fixture.

17. The method of claim 11, wherein the determined PWM setting is expressed as a percentage of a maximum current for the lighting fixture.

18. The method of claim 11, wherein the determined PWM setting for each of the plurality of lighting fixtures is different.

19. The method of claim 11, wherein each lighting fixture stores different calibration data, the differences caused by manufacturing differences between each lighting fixture.

20. A non-transitory processor-readable storage medium having stored thereon processor executable instructions configured to cause a processor of a controller to perform operations comprising:

receiving, from each of a plurality of lighting fixtures supporting a plurality of color channels, a maximum light output for each color channel;

setting, for each color channel, a maximum allowable light output equal to the smallest maximum light output received from each of the plurality of lighting fixtures for that color channel;

receiving a user input for a first color channel in the plurality of color channels, wherein the user input comprises a light parameter measured at a plant canopy of one or more plants grown in a plant bed irradiated by the plurality of lighting fixtures;

determining a pulse width modulation (PWM) setting of the first color channel such that the plurality of lighting fixtures irradiates the plant bed according to the user input based on calibration data stored in each of the plurality of lighting fixtures, wherein the calibration data converts the user input into PWM settings; and apply, to each of the plurality of lighting fixtures, the maximum allowable light output of the first color channel modulated by the determined PWM setting of the first color channel for that lighting fixture.

* * * * *